US012699569B2

(12) United States Patent
Holzbaur et al.

(10) Patent No.: US 12,699,569 B2
(45) Date of Patent: Aug. 4, 2026

(54) SELF-PROVISIONING AND FLEXIBLE HARDWARE ACCELERATOR ARCHITECTURE

(71) Applicant: Infineon Technologies AG, Neubiberg (DE)

(72) Inventors: Lukas Holzbaur, Munich (DE); Manuela Meier, Munich (DE); Avni Bildhaiya, Strasslach-Dingharting (DE); Mathias Waldenburger, Munich (DE); Alexander Zeh, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/678,861

(22) Filed: May 30, 2024

(65) Prior Publication Data

US 2025/0370716 A1     Dec. 4, 2025

(51) Int. Cl.
*G06F 9/38* (2018.01)

(52) U.S. Cl.
CPC .......... *G06F 9/3858* (2023.08); *G06F 9/3877* (2013.01); *G06F 9/3881* (2013.01)

(58) Field of Classification Search
CPC .... G06F 9/3877; G06F 9/3879; G06F 9/3881; G06F 9/3858
See application file for complete search history.

(56) References Cited

U.S. PATENT DOCUMENTS

| | | | |
|---|---|---|---|
| 2002/0124156 A1* | 9/2002 | Yoaz ..................... | G06F 9/3834 |
| | | | 712/225 |
| 2009/0210655 A1* | 8/2009 | Barrick ............... | G06F 9/30181 |
| | | | 712/E9.001 |
| 2015/0324135 A1* | 11/2015 | Chan ..................... | G06F 3/0689 |
| | | | 711/146 |
| 2019/0319797 A1* | 10/2019 | Suresh .................. | H04L 9/0869 |
| 2019/0384707 A1* | 12/2019 | Doshi ................... | G06F 3/0613 |

OTHER PUBLICATIONS

Poppelmann , Thomas, and Tim Güneysu . "Towards Practical Lattice Based Public Key Encryption on Reconfigurable Hardware." In International Conference on Selected Areas in Cryptography , 68 85. Springer, 2013.
Banerjee, Utsav, Tenzin S Ukyab , and Anantha P Chandrakasan . "Sapphire: A Configurable Crypto Processor for Post Quantum Lattice Based Protocols (Extended Version)," 2019, 56.

(Continued)

*Primary Examiner* — Keith E Vicary
(74) *Attorney, Agent, or Firm* — Banner & Witcoff, Ltd.

(57) ABSTRACT

A hardware (HW) accelerator architecture is described that adapts to a number of post-quantum cryptography (PQC) algorithms. The architecture determines whether to re-provision memory that stores constants values for arithmetic computations used for executed PQC algorithms. The architecture enables only a single set of constants to be stored at any particular time and the memory only needs to have a capacity to ensure that the largest set of constants among one of several PQC algorithms is stored while obviating the need to store the constants used across all PQC algorithms.

22 Claims, 5 Drawing Sheets

(56) References Cited

OTHER PUBLICATIONS

Fritzmann , Tim, Georg Sigl , and Johanna Sepúlveda . "RISQ V: Tightly Coupled RISC V Accelerators for Post Quantum Cryptography." IACR Transactions on Cryptographic Hardware and Embedded Systems, 2020, 239 80.

Fritzmann , Tim, and Johanna Sepulveda . "Efficient and Flexible Low Power NTT for Lattice Based Cryptography." In 2019 IEEE International Symposium on Hardware Oriented Security and Trust (HOST) HOST), 141 50. IEEE, 2019.

Roy, Sujoy Sinha, Frederik Vercauteren , Nele Mentens , Donald Donglong Chen, and Ingrid Verbauwhede. "Compact Ring LWE Cryptoprocessor ." In International Workshop on Cryptographic Hardware and Embedded Systems , 371 91. Springer, 2014.

Fritzmann , Tim, Michiel Van Beirendonck , Debapriya Basu Roy, Patrick Karl, Thomas Schamberger, Ingrid Verbauwhede , and Georg Sigl . "Masked Accelerators and Instruction Set Extensions for Post Quantum Cryptography," 2021.

Karl, Patrick, Jonas Schupp, Tim Fritzmann , and Georg Sigl . "Post Quantum Signatures on RISC V with Hardware Acceleration," 2022.

* cited by examiner

SELF-PROVISIONING AND FLEXIBLE HARDWARE ACCELERATOR ARCHITECTURE

TECHNICAL FIELD

The disclosure generally relates to the use of a hardware accelerator architecture and, more particularly, to the use of a hardware accelerator architecture that flexibly adapts to the processing needs of a variety of different post-quantum cryptography (PQC) algorithms using a self-provisioning memory process.

BACKGROUND

In anticipation of the significant processing power made available via the advent of quantum computing, PQC algorithms have been developed. Such PQC algorithms comprise, for example, CRYSTALS-KYBER for key-encapsulation mechanisms (KEM), as well as CRYSTALS-DILITHIUM, FALCON, and SPHINCS+ for Digital Signature Algorithms (DSAs). The security of CRYSTALS-KYBER, CRYSTALS-DILITHIUM, and FALCON (as well as other conventional PQC algorithms such as, e.g., NTRU and SABER) is based on mathematical problems related to (module-) lattices, and offer a good trade-off between performance, key size, and security.

Hardware accelerators may be used as part of such PQC algorithms, which often implement what are known as number theoretic transforms (NTT) and inverse NTTs. The NTT is a mathematical generalization of the Discrete Fourier Transform (DFT) over rings. The NTT is therefore one of the most computationally-intensive operations in the execution of PQC algorithms and requires a large amount of memory as well as a complex memory access pattern. However, due in particular to the large memory requirements, conventional hardware accelerators used for PQC algorithms are generally designed for a single, dedicated PQC algorithm. Thus, such conventional hardware accelerator architectures suffer from a lack of efficient coefficient storage and utilization, and also lack the flexibility to be adapted for use with multiple PQC algorithms.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The example aspects of the present disclosure will be described with reference to the accompanying drawings. The drawing in which an element first appears is typically indicated by the leftmost digit(s) in the corresponding reference number.

SUMMARY

Figure 1:
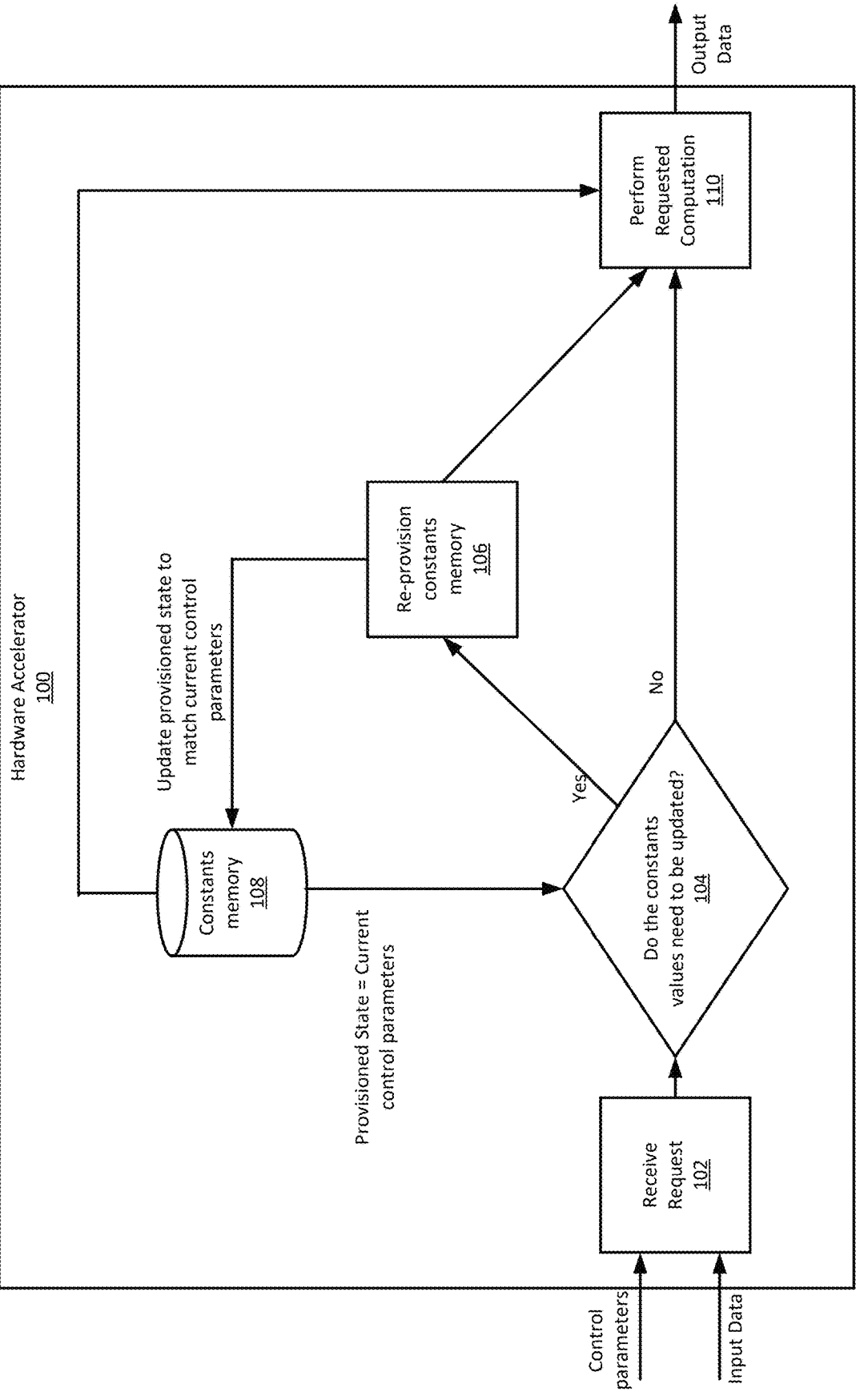
FIG. 1 illustrates a block flow diagram of a hardware accelerator architecture operation, in accordance with one or more embodiments of the disclosure.

The popularity of PQC algorithms is expected to continue to increase in light of the advancement of quantum computing. However, PQC is not as stable as classical asymmetric cryptography. In particular, different ongoing standardizations are still in flux with respect to PQC. Thus, current implementations of PQC hardware accelerator products require more flexibility to adapt to anticipated future changes, recognizing that future products may need to support many different algorithms and variants thereof. Therefore, hardware (HW) accelerators ideally need to efficiently address the needs of multiple PQC algorithms as part of a single architecture. More specifically, HW accelerators for PQC applications need to efficiently perform the required processing operations for multiple PQC algorithms to meet the demand for flexibility in this currently-evolving branch of cryptography.

With this in mind, and as noted above, the use of NTTs and inverse NTTs are among the most computationally intensive operations for lattice-based cryptography, which is commonly implemented as part of such PQC algorithms. A HW accelerator performs each NTT or inverse NTT (I-NTT) operation by applying various arithmetic computations, which may include one or more arithmetic operations such as adding, multiplication, bit shifting, etc., to an input data set, which typically comprises a set of coefficients. To do so, the HW accelerator may access what are referred to herein as "constants values," which comprise a set of data values that are stored in a memory in advance and then accessed from the memory when such computations are performed. The set of stored constants values represents a finite set of data values that are the same for any single PQC algorithm, but differ among different PQC algorithms. The set of constants values, as well as the various arithmetic computations that are to be performed, are defined by the control parameters of the particular PQC algorithm that is implemented, as further discussed herein.

Conventional HW accelerators used for such operations may pre-compute the constants values on-the-fly as needed, or need to be provisioned (e.g. computed and stored in a memory in advance) using software. Each of these techniques has various drawbacks. For instance, the pre-computation of constants requires significant memory space, particularly considering the flexibility to adapt to additional PQC algorithms requires the storage of a several complete constant sets. Additionally, the constants also need to change with any change to the control parameters, and therefore such HW accelerator architectures are not adaptable to changes in the control parameters that may occur over time. It is noted that the control parameters may not only change between different PQC algorithms, but also for different variants of the same PQC algorithm.

Additionally, computing the constants on-the-fly does not require the caching of the constants ahead of time. Therefore, a memory is not needed for storage of the constants in a memory/However, such computations require an increased logic area. Additionally, computing the constants on-the-fly results in a dynamic power consumption that presents difficulties in power management and efficiency of operation.

Finally, the use of software to provision the constants allows for greater flexibility and adaptability to new control parameters. However, this comes at the cost of a larger code size and/or an increase in the complexity of the application software. For example, the software needs to be aware of the HW accelerator state or otherwise check this state before every call, which may introduce significant operational latency.

To address these issues, the HW accelerator architecture as disclosed herein exploits the typical use of HW accelerators by acknowledging that, in many use cases, the same PQC algorithm and the same control parameters may be used repeatedly. Thus, each time the same PQC algorithm is executed, the arithmetic computations performed on a particular data set require the same constants to be retrieved from memory and used, as noted above. Therefore, the HW accelerator may initially provision one or more memories by computing and storing the constants using the control parameters for a specific PQC algorithm. Then, each time a new HW accelerator arithmetic computation is to be performed on a new set of data, a determination is made regarding whether the current constants values stored in memory are suitable for the current arithmetic computations. This may be performed, as one example and further discussed below, by determining whether the currently-received control parameters match those that were received for a previous HW accelerator arithmetic computation, with the previous control parameters resulting in the constants values being previously computed and stored. If so, then the constants values stored in the memory may be used for the current arithmetic computation without performing a memory re-provisioning process. Otherwise, the HW accelerator may re-provision one or more memories, and then use the updated stored constants in the memory for the current arithmetic computation.

In this way, the HW accelerator architecture as described herein may be adaptable to changes in the control parameters and thus maintain flexibility with any suitable number of different PQC algorithms as variants thereof. Additionally, the determination regarding whether to re-provision the one or more memories may be performed via a hardware implementation that does not require software interaction with the hardware accelerator, or only requires minimal interaction. Given this flexibility, only a single set of constants need to be stored at any particular time. Therefore, the size of the memory may be reduced compared to conventional HW accelerator architectures, as the memory needs to have a capacity to ensure that the largest set of constants among one of several PQC algorithms is stored while obviating the need to store the constants used across all PQC algorithms.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

I. Technological Overview

Again, the NTT and the I-NTT are used in many post-quantum cryptographic algorithms. In the context of these schemes, the NTT is a transform of a polynomial of degree$<n$ with coefficients in $\mathbb{Z}_q$ for some prime q (both parameters may differ depending on the scheme under consideration). Hence, the input and output of the NTT for example each consist of n integers$<q$, and are commonly represented by a vector of length n with at least w bits per entry, where w$\geq$ceil (log$_2$ (q)).

With this in mind, a HW accelerator may be implemented to perform the specific arithmetic computations on a data set in accordance with an NTT or an I-NTT, which may be received as part of input data provided by a host processor, as further discussed below. Thus, the host processor may provide, as input data to the HW accelerator, a vector of integers of a predetermined length. The host processor may execute the PQC algorithm and also provide the various control parameters to the HW accelerator to define how the arithmetic computation is to be performed on the data set (e.g. the vector of integers) by the HW accelerator. Thus, each PQC algorithm requires its own set of control parameters, and variants of PQC algorithms may likewise use different control parameters.

For example, the control parameters may comprise a value n, which specifies the length of the vector of integers n included in the input data (e.g. the data set upon which the NTT operation is to be performed). Additionally, the control parameters may comprise a value q, which represents the bit length of each of the vectors of integers n. Furthermore, the control parameters may comprise a value c, which represents the seed that may be utilized by the HW accelerator to compute all constants values in accordance with an expansion operation that is defined based upon the specific PQC algorithm. The control parameters may include additional or alternate parameters, such as a dimension/bit width, for instance. As will be discussed in further detail below, the HW accelerator may comprise an arithmetic logic unit (ALU) that retrieves the constants values (also referred to herein simply as "constants") for a particular arithmetic computation and PQC algorithm, and applies the constants values to the vector of integers to complete an NTT operation or an I-NTT operation that is then output by first being stored back to a data memory.

II. An Example Operation of a Flexible HW Accelerator Architecture

The various embodiments as discussed in further detail herein reference the use PQC algorithms that may perform arithmetic computations. These arithmetic computations may include any suitable arithmetic operations that may be executed in accordance with PQC algorithms or other suitable algorithms that use a set of constants values. Additionally, although the arithmetic computations may be discussed herein with respect to NTT operations, the embodiments additionally include the implementation of inverse NTT operations in accordance with the same architecture and functionality. Thus, the HW accelerator as discussed herein may access constants values to perform NTT operations as well as inverse NTT operations, as requested by the particular PQC algorithm function that is currently executed.

FIG. 1 illustrates a block flow diagram of a hardware accelerator architecture operation, in accordance with one or more embodiments of the disclosure. The various blocks as shown in FIG. 1 may represent the processes that are performed by the various components of the hardware (HW) accelerator 100 or the components themselves (such as in the case of the constants memory 108). Thus, the block flow diagram as shown in FIG. 1 is provided for ease of explanation, and the various components that perform the processes represented by the functional blocks as shown are discussed in further detail below with respect to FIGS. 2A-2C.

The block flow diagram as shown in FIG. 1 illustrates the various processes performed by a HW accelerator 100, which may receive data such as control parameters and input data from a separate component, such as a host processor as discussed herein (not shown in detail in FIG. 1). Again, the control parameters may include, as some examples, the length n of the vector of integers n included in the input data, the bit length of the vector of integers q, and the seed value c. The input data may include a data set (e.g. the data vectors) upon which the arithmetic computation is to be performed by the HW accelerator 100 in accordance with an executed PQC algorithm.

The receive request block 102 represents the processing of a received request that is transmitted to the HW accelerator 100 in accordance with a currently-executed PQC algorithm function. This may be included as part of the control parameters and/or the input data as shown. The request may represent a request by the host processor for the HW accelerator 100 to perform a specific arithmetic computation on a transmitted data set.

In response to receiving this request, the HW accelerator 100 makes a determination in block 104 whether the stored constants values need to be updated. This may include, for example, a determination of whether the currently received control parameters match the control parameters associated with the current provisioning of the constants memory 108. This determination may be performed, for instance, using a hardware implementation such as logic gates or other suitable hardware components. As an example, each time the constants memory 108 is provisioned, as further discussed below, the HW accelerator 100 may store the values of n, q, and c that were received at that time in any suitable memory location, such as in the constants memory 108 for example or any other suitable memory. Then, upon receiving a subsequent request with another data set, the HW accelerator 100 may assess the provisioned state of the constants memory 108 to determine whether the constants values need to be updated.

To do so, the HW accelerator 100 may determine whether the previously stored control parameters n, q, and c match the currently-received control parameters n', p', and c', as noted above. In other words, a comparison may be performed at block 104 between the stored control parameters n, q, and c and the currently-received control parameters n', p', and c'. The result of this comparison is a determination of whether the currently-received control parameters match the previously-received control parameters, which are associated with the constants memory 108 being provisioned, e.g. the constants values being previously stored in the memory 108.

If the stored control parameters n, q, and c match the currently-received control parameters n', q', and c', then the constants values do not need to be updated, and the HW accelerator 100 performs the requested arithmetic computation on the data set, as represented in block 110. This may include, for instance, executing the arithmetic computation on the data set using the constants values stored in the constants memory 108, as shown in FIG. 1. However, if the stored control parameters n, q, and c do not match the currently-received control parameters n', q', and c', then the HW accelerator 100 re-provisions the constants memory as shown in block 106. The re-provisioning process may include computing updated constants values from the seed value c in the currently-received control parameters, as noted above. The re-provisioning process may additionally include the allocation and/or storage of the computed constants values to update the contents of the constants memory 108 with the updated constants values. The re-provisioning process may include additional or alternate processes, as discussed in further detail below.

Regardless of how the re-provisioning is performed, upon being re-provisioned, the resulting provisioned state of the constants memory 108 now matches that required by the current control parameters to perform the current arithmetic computations. Thus, the requested computation on the data set may then be performed at block 110, which now uses the updated constants values stored in the constants memory 108. The arithmetic computation is thus performed in accordance with the current control parameters. In any event, performing the requested computation on the data set results in the generation of output data, which may be initially stored in a suitable memory (e.g. as part of a buffering operation) before being transmitted back to an external component such as a host processor. These functions are now discussed below in further detail below with respect to the HW accelerator architecture as shown in FIGS. 2A-2C.

III. Example Flexible HW Accelerator Architectures

Figure 2A:
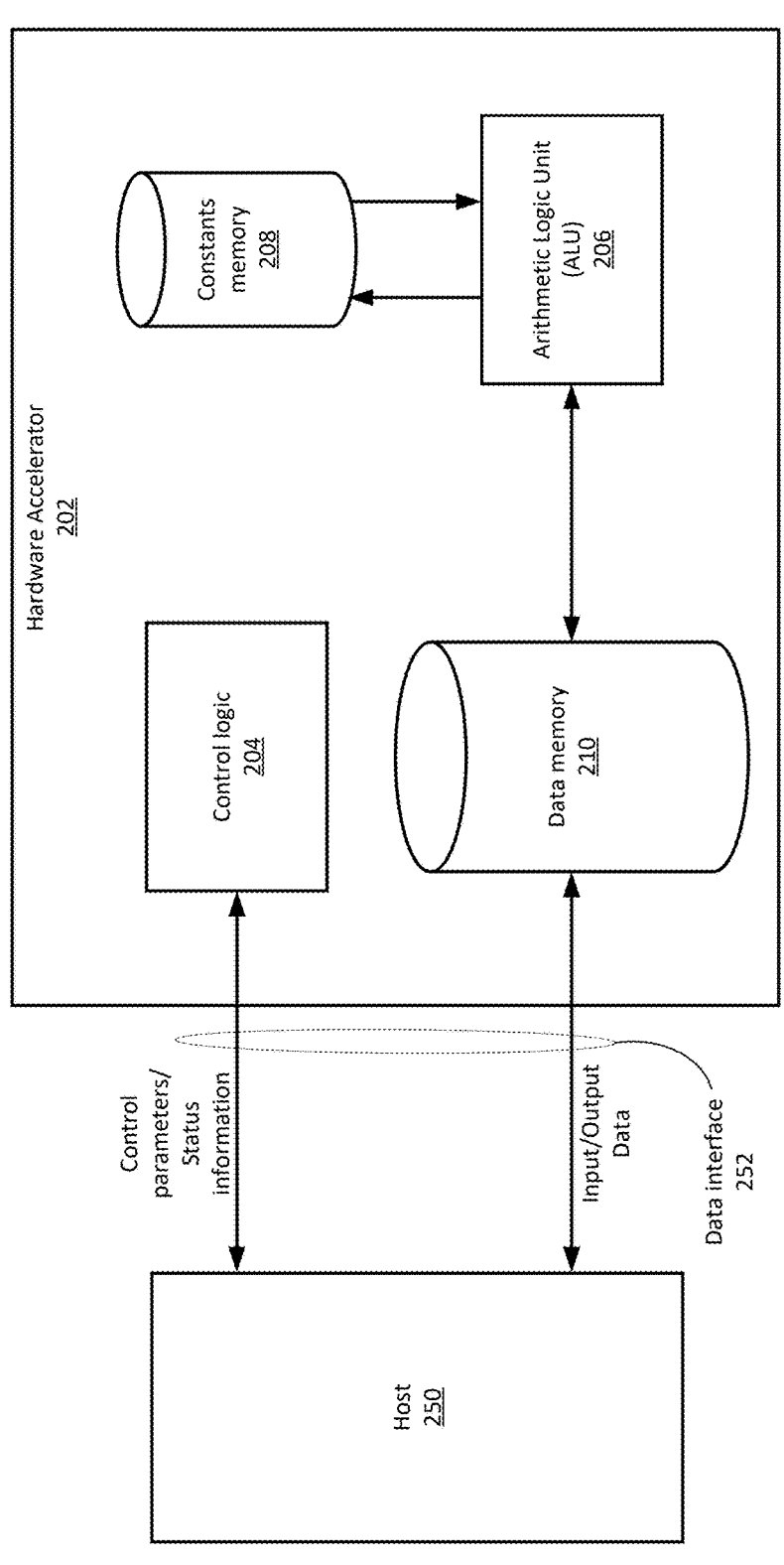
FIGS. 2A-2C illustrate block diagrams of a hardware accelerator architecture using various memory allocation schemes, in accordance with one or more embodiments of the disclosure.
Figure 2B:
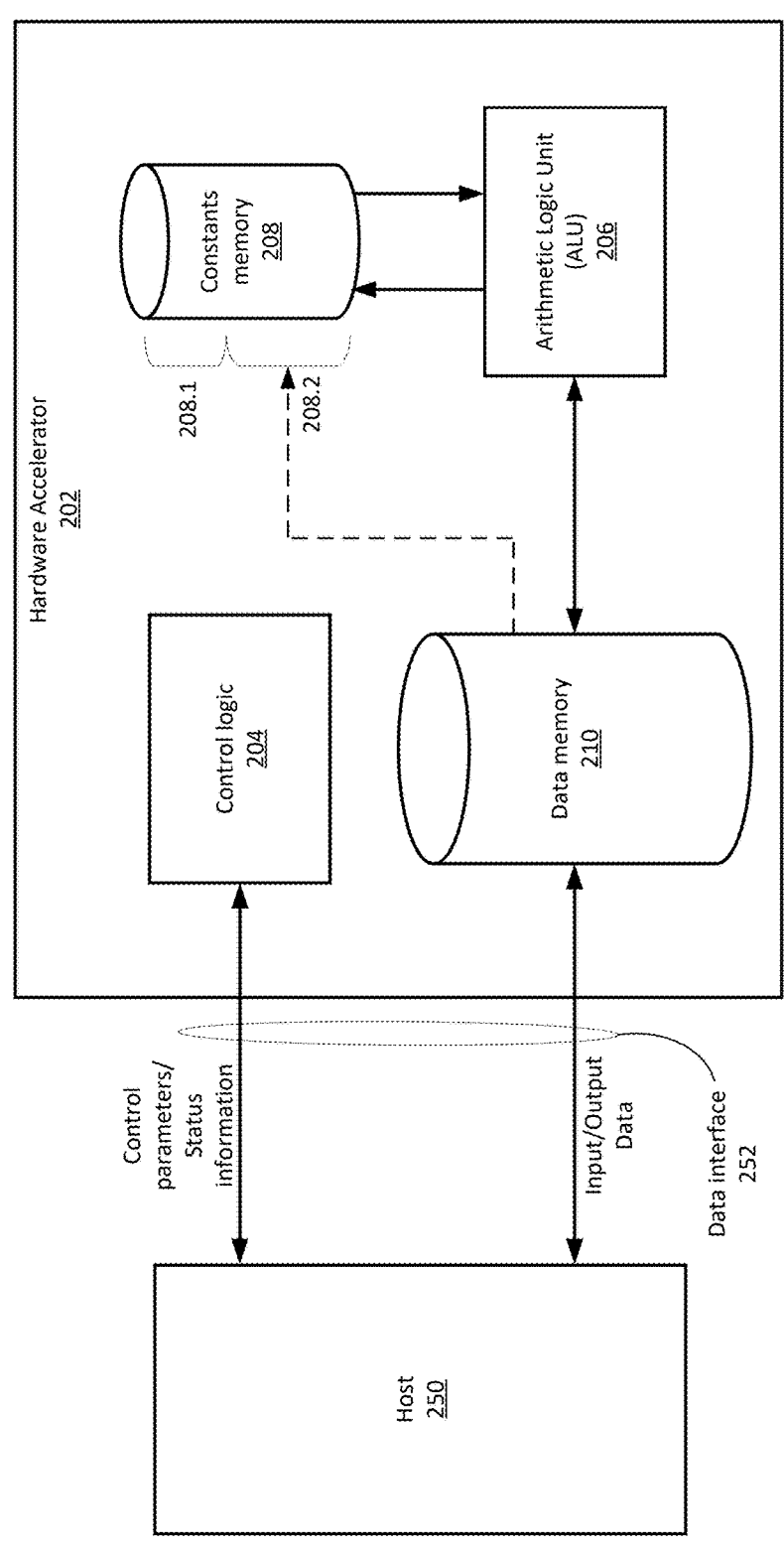
Figure 2C:
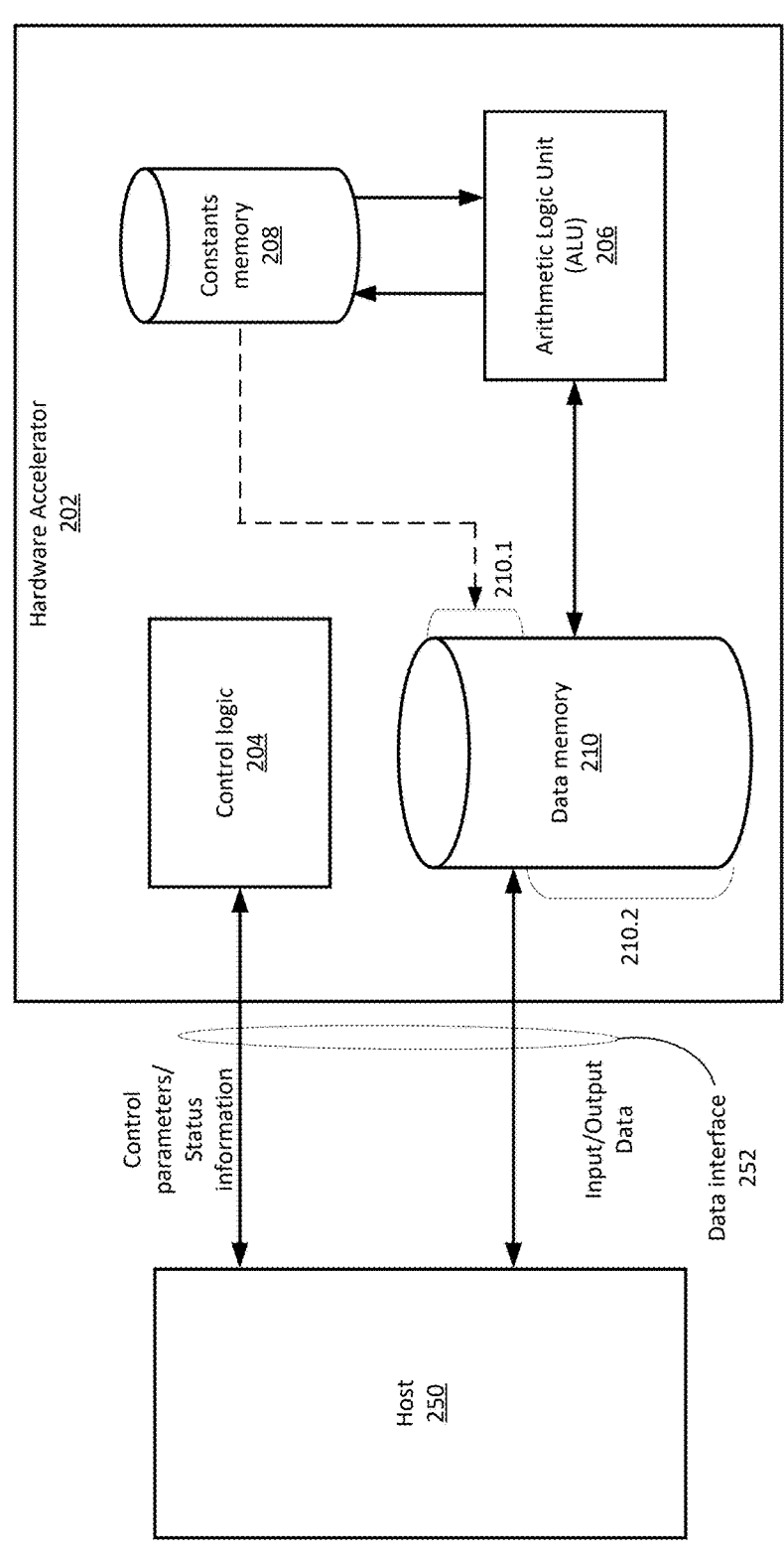

FIGS. 2A-2C illustrate block diagrams of a hardware accelerator architecture using various memory allocation schemes, in accordance with one or more embodiments of the disclosure. The various components as shown in FIGS. 2A-2C are provided by way of example and not limitation, and the hardware accelerator architecture as discussed in further detail herein with respect to FIGS. 2A-2C may include additional, fewer, or alternate components. For instance, status information is shown in FIGS. 2A-2C as being communicated by the host 250 and/or the hardware accelerator 202. The status information may represent any suitable type of status information that the host 250, the hardware accelerator, and/or components thereof may provide during the operation of the hardware accelerator 200 as discussed in further detail herein. The status information may provide data with respect to a current status of the hardware accelerator 202, which may include for example whether the hardware accelerator 202 is busy or ready to receive data, whether an error has occurred, etc. The host 250 may use this status information in accordance with any suitable techniques, including known techniques, to determine whether the hardware accelerator 202 is ready to receive new data or to perform alternate actions such as signaling an error condition, etc. The use of status data to synchronize the host 250 and the hardware accelerator 202 in this manner is generally known, and thus an additional description thereof is dispensed with for purposes of brevity.

FIG. 2A represents an embodiment in which the constants memory 208 stores constants values and the data memory 210 stores I/O data and/or other suitable types of data. In other words, in the embodiment as shown in FIG. 2A, the constants memory 208 and the data memory 210 are each dedicated to storing different types of data. For the embodiments as shown in FIGS. 2B and 2C, other types of data may be stored across both the constants memory 208 and the data memory 210, as further discussed below.

The hardware accelerator architecture 200 as shown in FIG. 2A represents an example architecture for executing any suitable number and/or type of PQC algorithms and their accompanying arithmetic computations, as discussed herein. The architecture 200 may be implemented as any suitable type of circuit components, software components, or combinations of these. For example, the architecture 200 may comprise an integrated circuit, a system on a chip, one or more interconnected SoCs or integrated circuits, etc. The architecture 200 may be implemented as part of any suitable system that utilizes PQC algorithms as discussed herein. For instance, the architecture 200 may form part of any suitable type of system that utilizes PQC algorithms for any suitable number and/or type of applications. This may include the use of PQC key generation, authentication, encryption and/ or decryption, etc. Moreover, although the techniques are discussed herein with respect to the use of PQC algorithms and their accompanying arithmetic computations such as NTTs and I-NTTs, this is by way of example and not limitation, and the embodiments as described herein may be implemented in accordance with any suitable application that utilizes hardware accelerators that access stored, pre-defined data to perform arithmetic computations in conjunction with one or more respectively executed algorithms.

The architecture 200 comprises a HW accelerator 202 that is communicatively coupled to a host 250. The HW accelerator 202 may be identified with the HW accelerator 100 as shown and discussed above with respect to FIG. 1. The host may be implemented as any suitable number and/or type of circuit components, software components, or combinations of these. For example, the host 250 may represent a processor, processing circuitry, and/or any suitable number and/or type of dedicated hardware components such as a microcontroller, an application specific integrated circuit (ASIC), a field programmable gate array (FPGA), a system on a chip (SoC), dedicated logic and/or other circuitry, etc. The host 250 may be implemented as one or more processors and/or cores, which may execute computer-readable instructions stored in a program memory to execute any suitable algorithm that utilizes the HW accelerator 202, such as the various PQC algorithms as discussed herein or any other suitable PQC algorithms, for example.

Thus, the host 250 may communicate with the HW accelerator 202 to cause the HW accelerator 202 to perform various arithmetic computations, as further discussed herein. These arithmetic computations may be any suitable number and/or type that the ALU 206 is configured to perform, as discussed herein. For instance, the HW accelerator 202 may be configured to perform NTT operations, inverse NTT operations, etc.

To do so, the architecture 200 comprises a data interface 252, which is configured to communicatively couple the host 250 to the hardware accelerator. Thus, the data interface 252 may comprise any suitable number and/or type of links configured to support data communications in accordance with any suitable number and/or type of communications protocols. The data interface 252 may represent one or more wired links, wireless links, or combinations of these. For example, the data interface 252 may comprise any suitable number of wires, terminals, ports, switches, pins, buses, buffers, drivers, antennas, transmitters, receivers, transceivers, etc. The host 250 may receive instructions, transmit instructions, receive data, and/or transmit data from other interconnected components of the device in which the architecture 200 is implemented via the data interface 252 and/or other suitable interfaces (not shown). For example, the host 250 may receive requests for key generation, signature generation, signature verification, key encapsulation, key decapsulation, or other suitable computations that are typically performed in the course of the execution of PQC algorithms. These computations may, for instance, include operations requested from the host 250 by other parts of the system in which the hardware accelerator architecture 200 is implemented.

As part of the execution of PQC algorithms, the host 250 may request the hardware accelerator to perform arithmetic computations on a data set that is transmitted to the HW accelerator 202 via the data interface 252 as part of (or the entirety of) the input data, as shown in FIG. 2A. When this data set and request are transmitted to the HW accelerator 202, the host 250 also transmits control parameters that are associated with an executed cryptographic algorithm (e.g. a PQC algorithm) that uses the arithmetic computation that is performed on the data set via the HW accelerator 202. Again, these control parameters may include n (the length the vector of integers n included in the data set), q (the bit length of the vector of integers), and c, the seed value. As noted above, each different PQC algorithm that is executed via the host 250 is associated with a respective control parameter set, and thus the control parameters transmitted to the HW accelerator 202 may include additional or alternative parameters. As discussed in further detail below, the HW accelerator 202 then uses the control parameters to perform the arithmetic computation on the data set to compute output data that is transmitted by the HW accelerator 202 to the host 250.

To perform these functions, the HW accelerator 202 comprises control logic 204, an arithmetic logic unit (ALU) 206, a constants memory 208, and a data memory 210. The control logic 204 may comprise hardware components, processing circuitry, and/or any suitable number and/or type of dedicated hardware components such as a microcontroller, an application specific integrated circuit (ASIC), a field programmable gate array (FPGA), a system on a chip (SoC), dedicated logic and/or other circuitry, etc. The control logic 204 may be implemented as hardware, software, or combinations of these to facilitate the various functions of the HW accelerator 202 as further discussed herein. For example, the control logic 204 may be implemented as one or more processors and/or cores, which may execute computer-readable instructions stored in a program memory to perform any of the various functions as discussed in further detail herein.

The control logic 204 is configured to control the operation of the HW accelerator 202 to realize any of the functionality as discussed herein, such as the functions discussed above with respect to the blocks 102, 104, and 106 of the block flow diagram as shown in FIG. 1. Although no connections are shown between the control logic 204 and any other components of the HW accelerator 202, it will be understood that the control logic 204 may communicate with and/or control any components of the HW accelerator 202 to perform the various functions as discussed herein. This may be achieved, for example, via any suitable connections and/or links between the control logic 204, the ALU 206, the constants memory 208, and/or the data memory 210, despite such connections not being shown the Figures for purposes of brevity.

For example, the control logic 204 may receive input data from the host 250, receive and process requests from the host 250, as well as transmit the output data back to the host 250 or other suitable components. As another example, the control logic 204 may be configured to control the operation of the various components of the HW accelerator 202, and may cause the various components of the HW accelerator 202 to perform their respective operations, as further discussed herein, which may include the ALU 206. As an additional example, the control logic 204 may also monitor and/or maintain provisioned state information regarding the various memories of the HW accelerator 202, as further discussed below.

The control logic 204 may function as a memory controller and/or work in conjunction with one of more memory controllers (not shown) to facilitate the provisioning and/or re-provisioning of the constants memory 208 and/or the data memory 210. The provisioning process may refer to an initial storage of constants values in one or more memory locations, which may be performed at startup, during manufacturing, etc., based upon the desired application and anticipated usage, for example. The provisioning and/or re-provisioning process may be triggered, initiated, controlled, or otherwise caused by the control logic 204, which may perform the provisioning and/or re-provisioning process and/or control other components of the HW accelerator 202 to cause a provisioning and/or a re-provisioning process to be performed.

As described in further detail herein, the provisioning and re-provisioning processes may include the computation of the data values to be stored in a respective memory, the allocation of portions of a respective memory to store a specific type of data, writing the contents of a respective memory with computed data values and/or transferring data values from another memory location, or otherwise overwriting the contents of a respective memory with updated constants values, which may be alternatively be referred to herein as data values. In other words, the control logic 204 is configured to control the operations of the HW accelerator 202 to ensure that the contents of the constants memory 208 and/or the data memory 210 comprise the requisite data values required to enable the arithmetic computations to be performed by the ALU 206, with the results being transmitted back to the host 250.

To this end, the ALU 206 may be implemented as any suitable hardware components that are configured to perform one or more arithmetic computations on the received data set using data values (e.g. constants values) that are accessed from the constants memory 208. The ALU 206 is configured to perform the functionality discussed above with respect to the block 110 of the block flow diagram as shown in FIG. 1. It is noted that the ALU 206 is configured to additionally compute the data values that are stored in the constants memory 208, which again are subsequently used to perform the arithmetic computations on the received data sets. Thus, the arithmetic computations used by the ALU 206 to generate the data values (e.g. the constants values) may be identical to the arithmetic computations that may later be performed on the data sets by accessing the same data values from the constants memory 208.

In an embodiment, the ALU 206 may compute the data values stored in the constants memory 208 using the seed value c received from the host 250 as part of the control parameters. For instance, the ALU 206 may be configured to compute constants values from the seed value c in a manner that is defined by the particular PQC algorithm that is implemented via the host 250. Again, such PQC algorithms may include CRYSTALS-KYBER, CRYSTALS-DIL-ITHIUM, FALCON, NTRU, SABER etc., and thus the computed constants values may be identified with the NTT and/or the I-NTT constants that are implemented in accordance with such PQC algorithms. For example, these constants values may be computed based upon an expansion of the seed c and represent powers of a pre-defined element depending upon the particular PQC algorithm that is used. Thus, regardless of the PQC algorithm, once expanded from the seed value c, the constants values may then be stored in the constants memory 208 as data values that are used for subsequent arithmetic computations performed by the ALU 206, as further discussed herein.

The ALU 206 may be implemented, for example, as a combinational digital circuit that performs arithmetic and bitwise operations on integer binary numbers. The arithmetic computations performed via the ALU 206 may be predetermined arithmetic computations that are defined in accordance with a particular PQC algorithm that is executed by the host 250. The ALU 206 may perform the same type of arithmetic computations regardless of the particular PQC algorithm that is currently executed by the host 250, but may use different sets of constants values for each PQC algorithm to do so, in accordance with the received control parameters as noted herein. The ALU 206 may perform the arithmetic computation, which again may comprise an NTT or an I-NTT operation, on the received data set by accessing the set of constants values that are currently stored in the constants memory 208. The manner in which these arithmetic computations are performed is generally known and defined by the various PQC standards, and thus an additional description of these arithmetic computations is not provided herein for purposes of brevity.

The ALU 206 is configured to write data to and/or read data from the constants memory 208 and/or the data memory 210. This may be achieved, for example, via any suitable connections and/or links between the ALU 206, the constants memory 208, and/or the data memory 210, which are represented in FIG. 2A as the various arrows connecting these components. The ALU 206 may perform the memory reading and/or writing operation independently or under control and/or in conjunction with the control logic 204 and/or other suitable components, such as memory controllers for instance.

Each of the constants memory 208 and the data memory 210 may be implemented as any suitable type of storage component having any suitable memory capacity based upon the particular application. For example, the constants memory 208 and the data memory 210 may be implemented as a volatile memory such as random access memory (RAM) or as non-volatile memory, such as an electrically erasable programmable read-only memory (EEPROM). For the embodiment as illustrated in FIG. 2A, the constants memory 208 and the data memory 210 may each store different types of data values. The constants memory 208 may be identified with the constants memory 108 as shown and discussed above with respect to FIG. 1.

For instance, and as shown in FIG. 2A, the constants memory 208 may be a memory dedicated to storing the constants values used by the ALU 206 to perform the arithmetic computations on the received data sets, as discussed herein. The constants memory 208 may store any suitable type of data values that are used by the ALU 206 to perform these arithmetic computations. For example, if the ALU 206 performs both NTT and I-NTT operations, then the constants memory 208 may store the constants values that are used for both NTT and I-NTT operations.

The size of the constants memory 208 may have a capacity that is a function of the maximum capacity needed to store the constants values for any single PQC algorithm that is supported by the HW accelerator architecture 200. That is, as a result of the selective re-provisioning memory process as discussed herein, the constants memory 208 only needs to store a single set of constants values that correspond to a currently-executed PQC algorithm. To provide an illustrative example, the constants memory 208 may have a storage capacity configured to store a largest set of constants values, which correspond to an NTT operation and/or an I-NTT operation used in accordance with one of several different supported PQC algorithms. However, this memory capacity may advantageously still be less than that required for storing the total of all constants values corresponding to the NTTs and/or the I-NTTs operations used for each supported PQC algorithm. In this way, the HW accelerator architecture 200 may support any suitable number of such PQC algorithms by selectively updating the constants values to adapt to additional PQC algorithms as they are executed, as discussed in further detail herein.

For the embodiment as shown in FIG. 2A, the data memory 210 may be a memory dedicated to storing data other than the constants values, which may include the input data, output data, as well as any other suitable data used by the HW accelerator architecture 200. For instance, the data memory 210 may store the input data received from the host 250 as well as the output data provided by the ALU 206 after performing arithmetic computations. Thus, the data memory 210 may function as a buffer to temporarily store input data that is received from the host as well as output data that is transmitted to the host 250 as a PQC algorithm is executed. Additionally, the data memory 210 may store other suitable data, such as intermediate computations, current control values used to compute the constants values stored in the constants memory 208, etc. As yet another example, the data memory 210 may store program memory that is executed by the control logic 204. The data memory 210 may be the same size and/or type of memory as the constants memory 208, or the memories may be different in terms of their capacities and/or type.

Again, the control logic 204 is configured to receive requests from the host 250 to perform arithmetic computations on a received data set, which may be part of or the entirety of the input data transmitted by the host 250. The control logic 204 is also configured to determine whether the data values stored in the constants memory 208 need to be overwritten with updated data values. Again, to do so, the control logic 204 may determine a provisioned state of the constants memory 208 and, based upon this determination, further determine whether the data values stored in the constants memory 208 need to be updated for the ALU 206 to perform the currently-requested arithmetic computation.

As one example, and as discussed above, the control logic 204 may receive the control parameters that are associated with the current request and compare these currently-received control parameters to the control parameters that were associated with the data values that are currently stored in the constants memory 208, i.e. prior to receiving the request. The control parameter sets may be compared in this manner using logic and/or hardware circuitry that may perform a bitwise comparison of previously-received control parameters n, q, and c with currently-received control parameters n', p', and c', as described above. Of course, any suitable combination, subset, and/or alternative or additional control parameters may be used for this comparison.

Thus, by comparing the control parameters used to store the current data values in the constants memory 208 with those received with a current request, the control logic 204 may determine whether the provisioned state of the constants memory 208 is the correct one for the ALU 206 to perform a currently-requested arithmetic computation. That is, when the contents of the constants memory 208 includes the constants values that are used for arithmetic computations for the current PQC algorithm, then the control parameters will match, and the constants memory need not be updated. In other words, when currently received control parameters match the previously-received control parameters in this manner, it may be inferred that the current PQC algorithm associated with the received control parameters and the PQC algorithm associated with the previously-received control parameters are the same. Thus, in this scenario, the control logic 204 will not cause the data values stored in the memory to be overwritten with the updated data values. However, when the received control parameters do not match the previously-received control parameters, the control logic 204 is configured to cause the data values stored in the constants memory 208 to be re-provisioned. Again, this is performed by overwriting the currently stored data values with updated data values corresponding to those used for the currently-requested arithmetic computation to be performed by the ALU 206.

As noted above, this re-provisioning process may include the ALU 206 computing new constants values from an expansion of the currently-received seed value c provided as part of the control parameters. Once computed, the resulting constants values are then stored in the constants memory 208 by overwriting the previously-stored data values. As a result, upon being re-provisioned, the constants memory 208 stores a set of updated constants values that are used in accordance with the current request to perform the arithmetic computation. In this way, the control logic 204 selectively causes data values stored in the constants memory 208 to be overwritten with updated data values based upon whether the received control parameters match previously-received control parameters that are associated with the data values being previously stored in the constants memory 208.

As a result, the ALU 206 is configured to perform the arithmetic computation using the data values stored in the constants memory 208, but these data values may correspond, at the time the arithmetic computation is actually performed, with the previously-stored data values or the updated data values, e.g. based upon whether the control logic 204 determines that the constants memory 208 needs to be re-provisioned prior to the arithmetic computation being performed. Advantageously, these processes performed by the control logic 204 and the ALU 206, which allow for the selective re-provisioning of the data values stored in the constants memory 208 and the arithmetic computations to be performed using the required stored data values, may occur independently of software processes. That is, the various functions of the HW accelerator 202 described herein may be performed in response to communications received from the host 250, but the use of the control logic 204 as described herein may be performed without intervention of any system level software and without such software requiring any knowledge of the state of the HW accelerator 202, thereby simplifying code and increasing execution speed and efficiency.

To provide an illustrative example, the ALU 206 may be configured to perform NTT or inverse NTT (I-NTT) operations using the data values stored in the constants memory 208. In such a case, the data values stored in the constants memory 208 comprise the constants values corresponding to an NTT operation or an I-NTT operation associated with a particular cryptographic algorithm that is being executed by the host 250. Upon the constants memory 208 being re-provisioned, the updated data values stored in the constants memory 208 comprise different constants values corresponding to a different NTT operation or a different I-NTT operation that is associated with a different PQC algorithm that is being executed by the host 250. In this way, the HW accelerator architecture 200 may support the execution of a number of different PQC algorithms by dynamically updating the contents of the constants memory 208, but only do so when this is needed due to a change in the control parameters.

Although the state of the constants memory 208 is described above via the use of a control parameter comparison process, this is by way of example and not limitation. The control logic 204 may determine the state of the constants memory 208 and whether the contents thereof need to be updated via re-provisioning in any suitable manner. As another example, the control logic 204 may request that the ALU 206 generate a subset of a predetermined number of the expanded constants values from the seed values, and compare this initial subset of constants values to their counterparts that are stored in the constants memory 208. The control logic 204 may thus determine whether re-provisioning is needed when this subset of constants values do not match one another, which is indicative of a new, different PQC algorithm being executed that requires the constants values stored in the constants memory 208 to be updated in their entirety.

As yet another example, the control logic 204 may cause the ALU 206 to perform the re-provisioning process in response to an explicit request to do so from the host 250. This may be performed, for instance, without necessarily checking the state of the constants memory 208 or determining whether the re-provisioning process may include the ALU 206 computing new constants values from an expansion of the currently-received seed value c provided as part of the control parameters. Once computed, the resulting constants values are then stored in the constants memory 208 by overwriting the previously-stored data values. As a result, upon being re-provisioned, the constants memory 208 stores a set of updated constants values that are used in accordance with the current request to perform the arithmetic computation.

For example, and as described above with respect to FIG. 1, the control logic 204 may compare the previously-received control parameters n, q, and c with the currently-received control parameters n', p', and c'. Such a request may be indicated as part of the control parameters themselves, for example as a separate control parameter that may comprise one or more bits to provide a flag and/or binary indication of whether a re-provisioning request is being made by the host 250. As another example, the request to perform the re-provisioning process may be an explicit, separate request that is transmitted by the host 250 to the control logic 204 when the request for the HW accelerator 202 to perform the arithmetic computation is also requested. Such embodiments may be particularly useful, for example, when it is known that the PQC algorithm and/or the control parameters have been changed or when the constants memory 208 needs to be initially provisioned for first time use.

Again, FIG. 2A illustrates an example embodiment in which the constants memory 208 and the data memory 210 are each dedicated to storing different types of data. However, in other embodiments, such as those illustrated in FIGS. 2B and 2C, different types of data may be stored across both the constants memory 208 and the data memory 210. It is noted that the functionality of the hardware accelerator 202 as described above with respect to FIG. 2A is also applicable to the embodiments as shown in FIGS. 2B and 2C. Thus, the differences between each of the embodiments of FIGS. 2A-2C is with respect to the storage of the various types of data, and the manner in which the provisioning and re-provisioning of the data values stored in the constants memory 208 and/or the data memory 210 is performed as discussed above may be identical between all three embodiments. Thus, for purposes of brevity only differences between these embodiments is further described below.

Turning now to FIG. 2B, the constants memory 208 is configured with a portion 208.1, which is allocated to the storage of the data values used by the ALU 260 to perform the arithmetic computations as discussed above. Thus, the portion 208.1 of the constants memory 208 may store the same data values as described in FIG. 2A above with respect to the entirety of the constants memory 208. The portion 208.1 of the constants memory 208 may be defined in accordance with any suitable predetermined range of addresses that may be known and used by the control logic 204, the ALU 206, one or more memory controllers, etc., to ensure that the data values are stored and accessed by the ALU 206 and updated via the provisioning and re-provisioning processes as discussed herein.

The embodiment as shown in FIG. 2B may be particularly useful to provide for an efficient use of memory for PQC algorithms that implement a smaller dimension/bit width. That is, for some PQC algorithm implementations, the size of the constants memory needed to store the data values used by the ALU 206 to perform the arithmetic computations may be reduced, with the remaining portion 208.2 thus being available to store additional data that would otherwise be stored in the data memory 210. The portion 208.2 of the constants memory 208 may also be defined in accordance with any suitable predetermined range of addresses that may be known and used by the control logic 204, the ALU 206, one or more memory controllers, etc., to ensure data is stored and accessed by the ALU 206 as part of the arithmetic computations as discussed herein.

Again, the data memory 210 may store input data received from the host 250, output data that is generated by the ALU 260 after performing arithmetic computations, intermediate computations (e.g. for NTT and I-NTT operations), the current control values used to compute the constants values stored in the constants memory 208, etc. For the embodiment as shown in FIG. 2B, any combination of these different types of data may additionally or alternatively be stored in the portion 208.2 of the constants memory 208. Thus, the operations as described above with respect to FIG. 2A may still be performed as described, but the data stored in the data memory 210 may be expanded to include the portion 208.2 of the constants memory 208. Thus, in accordance with this embodiment, a single memory (e.g. the constants memory 208) may, at times, store both the data values used by the ALU 206 to perform arithmetic computations, a received data set upon which the arithmetic computations are to be performed, the output data results provided by the ALU 206, etc.

Turning now to FIG. 2C, the data memory 210 is configured with a portion 210.1, which in this case is allocated to the storage of the data values (e.g. the constants values) used by the ALU 206 to perform the arithmetic computations as discussed above. Thus, the portion 210.1 of the data memory 210 may store the same data values as described in FIG. 2A above with respect to the constants memory 208. The portion 210.1 of the data memory 210 may be defined in accordance with any suitable predetermined range of addresses that may be known and used by the control logic 204, the ALU 206, one or more memory controllers, etc., to ensure that the data values are stored and accessed by the ALU 206 and updated via the provisioning and re-provisioning processes as discussed herein.

The embodiment as shown in FIG. 2C may be particularly useful to provide for an efficient use of memory for PQC algorithms with a larger dimension/bit width. That is, for some PQC algorithm implementations, the size of the constants memory 208 needed to store the data values used by the ALU 206 to perform the arithmetic computations may be increased, and thus the constants memory 208 may "over-flow" into the portion 210.1 of the data memory 210. This allows the portion 210.1 of the data memory 210 to store additional constants values that would otherwise be stored in the constants memory 208 as discussed above with respect to FIG. 2A.

The remaining portion 210.2 of the data memory 210 remains available to store the various types of data as discussed herein, such as the input data received from the host 250, the output data that is generated by the ALU 206 after performing arithmetic computations, intermediate computations, the current control values used to compute the constants values stored in the constants memory 208 and the portion 210.1 of the data memory 210, etc. The operations as described above with respect to FIG. 2A may still be performed as described, but the data stored in the data memory 210 may be reduced to the portion 210.2 of the data memory 210 in the embodiment as shown in FIG. 2C. Thus, in accordance with this embodiment, a single memory (e.g. the data memory 210) may, at times, store both the data values used by the ALU 206 to perform arithmetic computations, a received data set upon which the arithmetic computations are to be performed, the output data results provided by the ALU 206, etc.

In additional embodiments, the allocation of the different types of data between the constants memory 208 and the data memory 210 may be dynamic in nature. For instance, an initial provisioning process may store data values in the constants memory 208 only, as shown in FIG. 2A. However, upon performing a re-provisioning process to update the data values used by the ALU 206, the data stored in the constants memory 208 may be reduced to a portion 208.1 of the constants memory 208 while expanding the data storage of the data memory 210 to include the portion 208.2 of the constants memory 208, as shown in FIG. 2B. Alternatively upon performing a re-provisioning process to update the data values used by the ALU 206, the data stored in the constants memory 208 may be expanded to be stored in the portion 210.1 of the data memory 210, as shown in FIG. 2C.

IV. Examples of Operational Variations of the HW Accelerator Architecture

The embodiments of the HW accelerator architecture 200 as discussed above with respect to FIGS. 2A-2C provide flexibility with respect to supporting several different PQC algorithms as well as efficient management of HW accelerator memory. In additional embodiments, the operation of the HW accelerator 202 may be further modified to provide additional advantages. Although these variations are discussed separately, this is for ease of explanation and not limitation, and it is noted that the variations discussed in this Section may be combined with one another or any of the other embodiments as discussed herein to realize additional advantages.

As one example, the embodiments as discussed above describe the provisioning of one or more memories to compute and store the data values used by the ALU 206 to perform the arithmetic computations. This provisioning process may be an initial provisioning that is performed in accordance with an explicit request from the host 250, as noted above. However, in other embodiments, the HW accelerator 202 may perform a self-provisioning without any external trigger such as an explicit request. This may include, for example, a provisioning process that is performed to store the data values used by the ALU 206 in accordance with a default or predefined scheme, which may be triggered upon startup for example. Additionally or alternatively, the control logic 204 may facilitate this self-provisioning process by determining the state of the constants memory 208 as being in a default state, having a remaining storage capacity in excess of a predetermined threshold that indicates that the constants memory currently stores no valid data, etc.

As another example, the host 250 may modify the timing of when various data is transmitted to the HW accelerator 202 to perform the arithmetic computations to increase the efficiency of operations. For example, for the embodiments described above, the host 250 may transmit the control parameters to the HW accelerator 202 at the same time as the input data and the request to perform the arithmetic computation. However, this schedule of data transmissions may be modified, with the control parameters being sent prior to the request and/or prior to the input data. In such scenarios, the HW accelerator 202 may check the current control parameters and determine whether a re-provisioning of memory is required prior to receiving the input data and the request. In this way, the HW accelerator 202 may check whether a re-provisioning is required and do so, if needed, in parallel with receiving the input data. Thus, in accordance with such embodiments, the time delay between storing the data set in the data memory 210 and the ALU 206 performing the arithmetic computations on this data set may be reduced.

To provide a further example, the re-provisioning process is described above with respect to the ALU 206 computing the updated data values, which are then stored in one or more memories. However, this re-provisioning process may alternatively include overwriting the data values stored in the constants memory 208 with data values that are retrieved from a separate memory (not shown). For example, the HW accelerator 202 may be part of a system that utilizes a larger and/or slower memory, such as a ROM for instance. Continuing this example, this ROM may store a larger set of pre-computed data values that are used by the ALU 206 to perform the arithmetic computations for the various different PQC algorithms. Thus, the re-provisioning process may include transferring (e.g. via the control logic 204, one or more memory controllers, etc.) data values from such a larger memory to the constants memory 208, which may be a faster and/or smaller memory. Such embodiments may be particularly useful when the anticipated time for the ALU 206 to compute the data values may exceed the time to load the data values from a different memory location.

As an additional example, in some embodiments the constants memory 208 (or the combination of the constants memory 208 and the portion 210.1 of the data memory 210) may enable more than one set of data values to be stored. That is, multiple sets of data values may be stored in some embodiments, with each set corresponding to a different PQC algorithm and/or a different variant of the same PQC algorithm as noted herein. In such a case, the re-provisioning process would only be required when a third PQC algorithm or a third configuration is executed, requiring a set of data values that are not presently stored. As an illustrative example, when configured to operate in accordance with CRYSTALS-DILITHIUM, CRYSTALS-KYBER, and Falcon, the constants for both CRYSTALS-DILITHIUM and CRYSTALS-KYBER can be stored in a 4.48 KB RAM (e.g. the constants memory 208), and thus re-provisioning only needed when Falcon is used.

As yet another example, the HW accelerator architecture 200 may support multiple PQC algorithms by modifying the manner in which the arithmetic computations are performed for some PQC algorithms. For example, the arithmetic computations performed by the ALU 206 may be executed over a larger number of stages, which requires additional time but results in less memory being used for the storage of intermediate results from the ALU arithmetic computations. This may be exploited to reduce the size of the data memory 210 that is required, which may then be allocated to store the data values for another set of constants values used by a different PQC algorithm. This embodiment is similar to that described above with respect to FIG. 2C, with the difference being that in this scenario the portion 210.1 of the data memory is allocated for storing one set of data values (e.g. the constants values) for one PQC algorithm, whereas constants memory 208 is allocated for storing another set of data values (e.g. constants values) for another PQC algorithm.

V. An Example Process Flow

Figure 3:
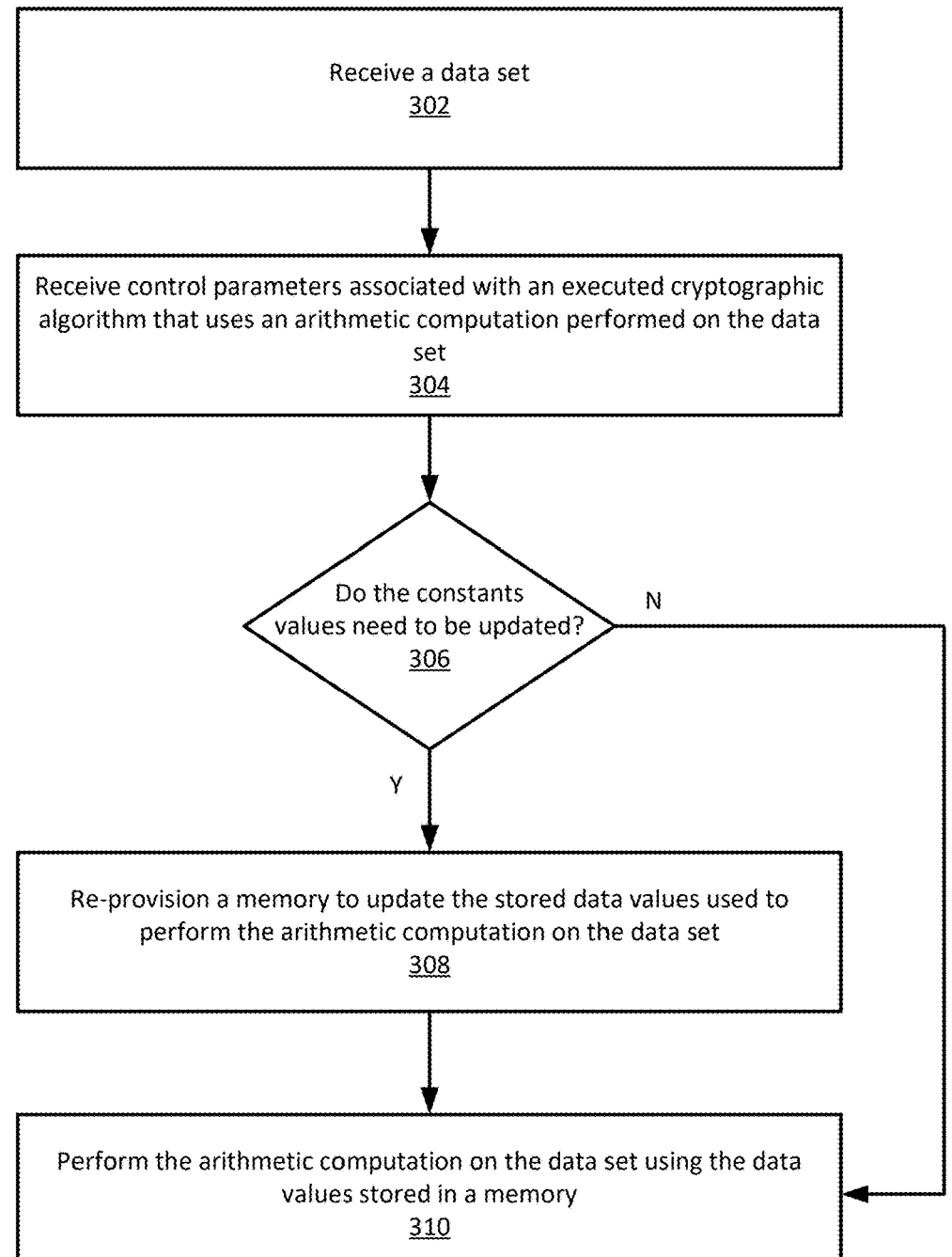
FIG. 3 illustrates an example process flow, in accordance with an embodiment of the disclosure.

FIG. 3 illustrates an example process flow, in accordance with an embodiment of the disclosure. The process flow 300 may comprise a method executed by and/or otherwise associated with any suitable number and/or type of components such as one or more processors (processing circuitry), hardware components, executed instructions (e.g. software components) or combinations of these. The components may be associated with one or more components of the HW accelerator architecture 200, as discussed herein. For example, the blocks as shown in FIG. 3 may be executed by any of the control logic 204, the ALU 206, etc. The process flow 300 may include alternate or additional blocks that are not shown in FIG. 3 for purposes of brevity, and may be performed in a different order than shown. Moreover, some blocks may be optional.

The process flow 300 begins with receiving (block 302) a data set. Again, the data set may comprise part of or the entirety of the input data that is transmitted by an external component, such as the host 250 for example. The data set may comprise any suitable data (e.g. a vector of integers n included in the input data) upon which an arithmetic computation is to be performed by the HW accelerator 202.

The process flow 300 further comprises receiving (block 304) control parameters associated with an executed cryptographic algorithm that uses an arithmetic computation performed on the data set. The cryptographic algorithm may comprise a PQC algorithm, as noted herein. Again, these control parameters may define the manner in which the arithmetic computation is performed, which may be a function of the particular cryptographic algorithm and/or a variant of a particular PQC algorithm. For instance, and as noted above, the control parameters may comprise a length n of the vector of integers n included in the input data, the bit length of the vector of integers q, the seed value c, a dimension/bit width, etc.

The process flow 300 further comprises determining (block 306) whether the constants values that are stored in one or more memories that are used to perform the arithmetic computation need to be updated. Again, this may include a determination (block 306) of whether the currently received control parameters match the previously-used control parameters (e.g. those used to compute and/or store the current constants values). This may also include, for example, receiving an explicit request from an external component such as the host processor 250 to perform a memory provisioning or re-provisioning process, as described herein. As another example, this may include determining the state of the one or more memories to determine whether the contents are suitable to perform the arithmetic computation in accordance with the current request.

If not, then the process flow 300 includes performing (block 310) the arithmetic computation on the data set using the stored constants values. Otherwise, the process flow 300 includes first re-provisioning (block 308) the one or more memories to overwrite the constants values with updated data values, which may include the ALU computing new constants values from a seed value, transferring new constants values from another memory, etc. Once updated (block 308), the process flow 300 includes performing (block 310) the arithmetic computation on the data set using the stored constants values, which have now been updated (block 308).

EXAMPLES

The techniques of this disclosure may also be described in the following examples.

Example 1. A hardware accelerator, comprising: a memory; control logic configured to: receive control parameters associated with an executed one of a plurality of cryptographic algorithms that uses an arithmetic computation performed on a data set; and selectively cause data values stored in the memory to be overwritten with updated data values based upon whether the received control parameters match previously-received control parameters that are associated with the data values being previously stored in the memory; and an arithmetic logic unit (ALU) configured to perform the arithmetic computation on the data set using either the data values or the updated data values.

Example 2. The hardware accelerator of Example 1, wherein the control logic is configured to cause the data values stored in the memory to be overwritten with the updated data values when the received control parameters do not match the previously-received control parameters.

Example 3. The hardware accelerator of any combination of Examples 1-2, wherein the control logic is configured to not cause the data values stored in the memory to be overwritten with the updated data values when the received control parameters match the previously-received control parameters.

Example 4. The hardware accelerator of any combination of Examples 1-3, wherein the received control parameters match the previously-received control parameters when the cryptographic algorithm from among the plurality of cryptographic algorithms associated with the received control parameters and the previously-received control parameters is the same.

Example 5. The hardware accelerator of any combination of Examples 1-4, wherein the control logic is configured to receive a request for overwriting the data values stored in the memory with the updated data values, and wherein the control logic is configured to cause the data values stored in the memory to be overwritten with the updated data values based upon the request.

Example 6. The hardware accelerator of any combination of Examples 1-5, wherein the arithmetic computation comprises a Number Theoretic Transform (NTT) operation or an inverse NTT (I-NTT) operation.

Example 7. The hardware accelerator of any combination of Examples 1-6, wherein the data values stored in the memory comprise constants values corresponding to an NTT operation or an I-NTT operation of one of the plurality of cryptographic algorithms, and wherein the updated data values stored in the memory comprise further constants values corresponding to a further NTT operation or a further I-NTT operation of a further one of the plurality of cryptographic algorithms.

Example 8. The hardware accelerator of any combination of Examples 1-7, wherein the memory has a storage capacity configured to store a largest set of constants values corresponding to an NTT or an I-NTT of one of the plurality of cryptographic algorithms, but less than a total of constants values corresponding to the NTTs or the I-NTTs of each of the plurality of cryptographic algorithms.

Example 9. The hardware accelerator of any combination of Examples 1-8, wherein the memory comprises a constants memory configured to store the constants values corresponding to the NTT or the I-NTT of one of the plurality of cryptographic algorithms, and further comprising: a data memory configured to store the data set and an output of the arithmetic computation on the data set performed via the ALU.

Example 10. The hardware accelerator of any combination of Examples 1-9, wherein the control logic is configured to selectively cause, based upon the received control parameters, a portion of the updated data values to be further stored in the data memory.

Example 11. The hardware accelerator of any combination of Examples 1-10, wherein (i) the control logic is configured to selectively cause the data values stored in the memory to be overwritten with updated data values, and (ii) the ALU is configured to perform the arithmetic computation on the data set using the data values or the updated data values, independently of software processes.

Example 12. The hardware accelerator of any combination of Examples 1-11, wherein the control logic is configured to selectively cause, based upon the received control parameters, (i) the updated data values, and (ii) a further data set upon which the arithmetic computation is performed in accordance with the executed one of the plurality of cryptographic algorithms, to be further stored in the memory.

Example 13. A computer-implemented method, comprising: receiving control parameters associated with an executed one of a plurality of cryptographic algorithms that uses an arithmetic computation performed on a data set; selectively overwriting data values stored in a memory with updated data values based upon whether the received control parameters match previously-received control parameters that are associated with the data values being previously stored in the memory; and performing the arithmetic computation on the data set using either the data values or the updated data values.

Example 14. The computer-implemented method of Example 13, wherein the selectively overwriting the data values stored in the memory with the updated data values comprises overwriting the data values stored in the memory with the updated data values when the received control parameters do not match the previously-received control parameters.

Example 15. The computer-implemented method of any combination of Examples 13-14, wherein the selectively overwriting the data values stored in the memory with the updated data values comprises overwriting the data values stored in the memory with the updated data values when the received control parameters match the previously-received control parameters.

Example 16. The computer-implemented method of any combination of Examples 13-15, wherein the received control parameters match the previously-received control parameters when the cryptographic algorithm from among the plurality of cryptographic algorithms associated with the received control parameters and the previously-received control parameters is the same.

Example 17. The computer-implemented method of any combination of Examples 13-16, further comprising: receiving a request for overwriting the data values stored in the memory with the updated data values, and wherein the selectively overwriting the data values stored in the memory with the updated data values comprises overwriting the data values stored in the memory with the updated data values based upon the request.

Example 18. The computer-implemented method of any combination of Examples 13-17, wherein the data values stored in the memory comprise constants values corresponding to an Number Theoretic Transform (NTT) operation or an inverse NTT (I-NTT) operation of one of the plurality of cryptographic algorithms, and wherein the updated data values stored in the memory comprise further constants values corresponding to a further NTT operation or a further I-NTT operation of a further one of the plurality of cryptographic algorithms.

Example 19. The computer-implemented method of any combination of Examples 13-18, wherein the memory has a storage capacity configured to store a largest set of constants values corresponding to an NTT or an I-NTT of one of the plurality of cryptographic algorithms, but less than a total of constants values corresponding to the NTTs or the I-NTTs of each of the plurality of cryptographic algorithms.

Example 20. The computer-implemented method of any combination of Examples 13-19, wherein the memory comprises a constants memory configured to store the constants values corresponding to the NTT or the I-NTT of one of the plurality of cryptographic algorithms, and further comprising: storing, via a data memory, the data set and an output of the arithmetic computation on the data set.

Example 21. The computer-implemented method of any combination of Examples 13-20, further comprising: selectively causing, based upon the received control parameters, the data memory to further store a portion of the updated data values.

Example 22. The computer-implemented method of any combination of Examples 13-21, further comprising: selectively causing, based upon the received control parameters, (i) the updated data values, and (ii) a further data set upon which the arithmetic computation is performed in accordance with the executed one of the plurality of cryptographic algorithms, to be further stored in the memory.

An apparatus as shown and described.

A method as shown and described.

CONCLUSION

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation data. The term "information" may in addition to any form of digital information also include other forms of representing information. The term "entity" or "unit" may in embodiments include any device, apparatus circuits, hardware, software, firmware, chips, or other semiconductors as well as logical units or physical implementations of protocol layers etc. Furthermore, the terms "coupled" or "connected" may be interpreted in a broad sense not only covering direct but also indirect coupling.

It is further to be noted that methods disclosed in the specification or in the claims may be implemented by a device having means for performing each of the respective steps of these methods.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A hardware accelerator, comprising:
a memory;
control logic configured to:
    receive control parameters associated with an executed one of a plurality of cryptographic algorithms, each one of the plurality of cryptographic algorithms executing a respective arithmetic computation on a respective data set; and
    selectively cause initial data values stored in the memory to be overwritten with updated data values based upon a determination of whether the received control parameters match previously-received control parameters that are associated with the initial data values stored in the memory; and
an arithmetic logic unit (ALU) configured to execute the respective arithmetic computation, which is associated with the executed one of the plurality of cryptographic algorithms, on the respective data set using the initial data values or the updated data values.

2. The hardware accelerator of claim 1, wherein the control logic is configured to cause the initial data values stored in the memory to be overwritten with the updated data values when the received control parameters do not match the previously-received control parameters.

3. The hardware accelerator of claim 1, wherein the control logic is configured to retain the initial data values stored in the memory to not be overwritten with the updated data values when the received control parameters match the previously-received control parameters.

4. The hardware accelerator of claim 1, wherein the received control parameters match the previously-received control parameters when the received control parameters and the previously-received control parameters are associated with the same cryptographic algorithm from among the plurality of cryptographic algorithms.

5. The hardware accelerator of claim 1, wherein the control logic is configured to receive a request for overwriting the initial data values stored in the memory with the updated data values, and
    wherein the control logic is configured to cause the initial data values stored in the memory to be overwritten with the updated data values based upon the request.

6. The hardware accelerator of claim 1, wherein the respective arithmetic computation, which is associated with the executed one of the plurality of cryptographic algorithms and performed on the respective data set, comprises a Number Theoretic Transform (NTT) operation or an inverse NTT (I-NTT) operation.

7. The hardware accelerator of claim 1, wherein the initial data values stored in the memory comprise first constants values corresponding to the previously-received control parameters, which are used in accordance with a first Number Theoretic Transform (NTT) operation or a first inverse NTT (I-NTT) operation, and
    wherein the updated data values selectively stored in the memory comprise second constants values corresponding to the received control parameters, which are used in accordance with a second NTT operation or a second I-NTT operation.

8. The hardware accelerator of claim 1, wherein each one of the plurality of cryptographic algorithms utilizes a respective set of constants values corresponding to a Number Theoretic Transform (NTT) operation or an inverse NTT (I-NTT) operation, and
    wherein the memory has a storage capacity configured to store a largest set of constants values from among the respective sets of constants values utilized by the plurality of cryptographic algorithms, but less than a total sum of the respective sets of constants values utilized by all of the plurality of cryptographic algorithms.

9. The hardware accelerator of claim 1, wherein the memory comprises:
a constants memory configured to store constants values corresponding to a Number Theoretic Transform (NTT) operation or an inverse NTT (I-NTT) operation corresponding to the respective arithmetic computation that is associated with the executed one of the plurality of cryptographic algorithms; and
a data memory configured to store the respective data set and an output of the respective arithmetic computation, which is associated with the executed one of the plurality of cryptographic algorithms, on the respective data set performed via the ALU.

10. The hardware accelerator of claim 9, wherein the control logic is configured to selectively cause, based upon the received control parameters, a portion of the updated data values to be further stored in the data memory.

11. The hardware accelerator of claim 1, wherein the control logic is configured to selectively cause the initial data values stored in the memory to be overwritten with the updated data values independently of software processes, and the ALU is configured to perform the respective arithmetic computation, which is associated with the executed one of the plurality of cryptographic algorithms, on the respective data set using the initial data values or the updated data values independently of software processes.

12. The hardware accelerator of claim 1, wherein the control logic is configured, when the initial data values stored in the memory are overwritten with updated data values, to cause the memory to store (i) the updated data values, and (ii) the respective data set upon which the respective arithmetic computation is executed by the ALU in accordance with the executed one of the plurality of cryptographic algorithms.

13. A computer-implemented method, comprising:

receiving control parameters associated with an executed one of a plurality of cryptographic algorithms, each one of the plurality of cryptographic algorithms executing a respective arithmetic computation on a respective data set; determining whether the received control parameters, which are associated with updated data values, match previously-received control parameters that are associated with initial data values stored in a memory;

selectively overwriting the initial data values stored in the memory with the updated data values based upon whether the received control parameters match the previously-received control parameters that are associated with the initial data values stored in the memory; and executing the respective arithmetic computation, which is associated with the executed one of the plurality of cryptographic algorithms, on the respective data set using the initial data values or the updated data values.

14. The computer-implemented method of claim 13, wherein the selectively overwriting the initial data values stored in the memory with the updated data values comprises overwriting the initial data values stored in the memory with the updated data values when the received control parameters do not match the previously-received control parameters.

15. The computer-implemented method of claim 13, wherein the selectively overwriting the initial data values stored in the memory with the updated data values comprises retaining the initial data values stored in the memory and not overwriting the initial data values when the received control parameters match the previously-received control parameters.

16. The computer-implemented method of claim 13, wherein the received control parameters match the previously-received control parameters when the received control parameters and the previously-received control parameters are associated with the same cryptographic algorithm from among the plurality of cryptographic algorithms.

17. The computer-implemented method of claim 13, further comprising:

receiving a request for overwriting the initial data values stored in the memory with the updated data values; and overwriting the initial data values stored in the memory with the updated data values based upon the request.

18. The computer-implemented method of claim 13, wherein the initial data values stored in the memory comprise first constants values corresponding to the previously-received control parameters, which are used in accordance with a first Number Theoretic Transform (NTT) operation or a first inverse NTT (I-NTT) operation, and wherein the updated data values selectively stored in the memory comprise second constants values corresponding to the received control parameters, which are used in accordance with a second NTT operation or a second I-NTT operation.

19. The computer-implemented method of claim 13, wherein each one of the plurality of cryptographic algorithms utilizes a respective set of constants values corresponding to a Number Theoretic Transform (NTT) operation or an inverse NTT (I-NTT) operation, and wherein the memory has a storage capacity configured to store a largest set of constants values from among the respective sets of constants values utilized by the plurality of cryptographic algorithms, but less than a total sum of the respective sets of constants values utilized by all of the plurality of cryptographic algorithms.

20. The computer-implemented method of claim 13, wherein the memory comprises a constants memory configured to store the constants values corresponding to a Number Theoretic Transform (NTT) operation or an inverse NTT (I-NTT) operation corresponding to the respective arithmetic computation that is associated with the executed one of the plurality of cryptographic algorithms, and further comprising:

storing, via a data memory, the respective data set and an output of the respective arithmetic computation, which is associated with the executed one of the plurality of cryptographic algorithms, on the respective data set.

21. The computer-implemented method of claim 20, further comprising:

selectively causing, based upon the received control parameters, the data memory to further store a portion of the updated data values.

22. The computer-implemented method of claim 13, further comprising:

when the initial data values stored in the memory are overwritten with updated data values, storing, (i) the updated data values, and (ii) the respective data set upon which the respective arithmetic computation is executed in accordance with the executed one of the plurality of cryptographic algorithms.

* * * * *